United States Patent [19]

Ikemoto et al.

[11] Patent Number: 4,636,977
[45] Date of Patent: Jan. 13, 1987

[54] LANGUAGE TRANSLATOR WITH KEYS FOR MARKING AND RECALLING SELECTED STORED WORDS

[75] Inventors: Yutaka Ikemoto, Nara; Ken Sawada, Ikoma, both of Japan

[73] Assignee: Sharp Kabushiki Kaisha, Osaka, Japan

[21] Appl. No.: 573,644

[22] Filed: Jan. 25, 1984

[30] Foreign Application Priority Data

Jan. 31, 1983 [JP] Japan ................................ 58-15747

[51] Int. Cl.⁴ .............................................. G06F 15/38
[52] U.S. Cl. .................................... 364/900; 364/419
[58] Field of Search ........................ 364/200, 900, 419

[56] References Cited

U.S. PATENT DOCUMENTS 4,193,119 3/1980 Arase ................................. 364/900
4,543,631 9/1985 Kurosu et al. ..................... 364/200
4,544,276 10/1985 Horodeck .......................... 400/110
4,587,635 5/1986 Hashimoto et al. ............... 364/900

Primary Examiner—Archie E. Williams, Jr.
Attorney, Agent, or Firm—Birch, Stewart, Kolasch & Birch

[57] ABSTRACT

An electronic translator includes an input device for inputting an entry word, an output device responsive to the input of the entry word for outputting a word equivalent to the entry word, a mark device by which the entry word and the equivalent word are marked as being stored, and an announcement device responsive to the output device for announcing that all the marked words have been outputted. Preferably, the announcement device is adapted to display or provide an announcement sound to show the occurrence of such a condition.

5 Claims, 12 Drawing Figures

FIG. 10
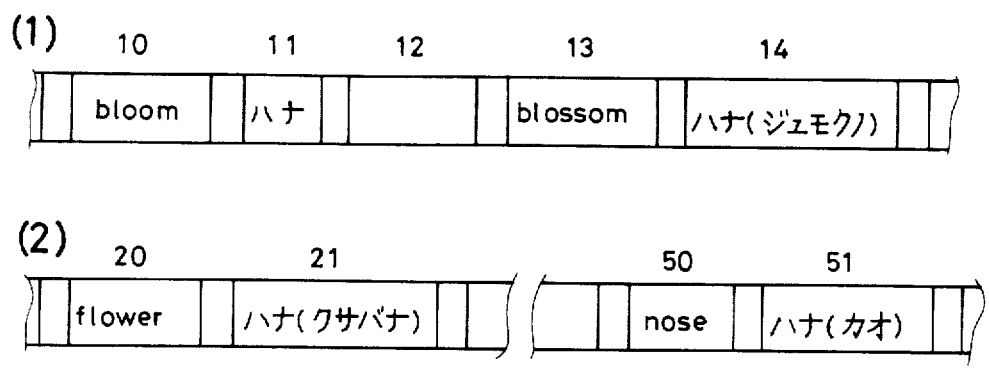
FIG. 11
| JPN. WORDS | Serial NO. |
|---|---|
| ハナ | 11 |
| ハナ(カオ) | 51 |
| ハナ(クサバナ) | 21 |
| ハナ(ジュモクノ) | 14 |
| ハナガサク | 12 |
| ハナシ | 82 |
| ハナシカケル | 75 |
FIG. 12
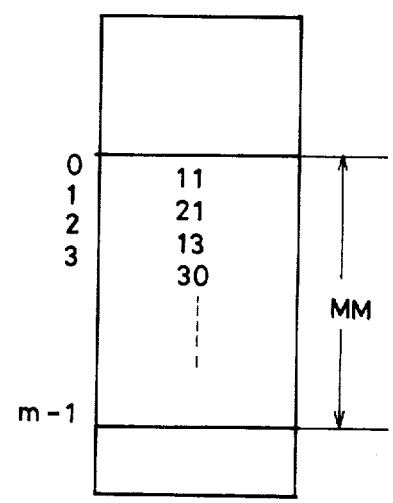

LANGUAGE TRANSLATOR WITH KEYS FOR MARKING AND RECALLING SELECTED STORED WORDS

BACKGROUND OF THE INVENTION

The present invention relates to a word information storage and retrieval device and, more particularly, to an electronic dictionary or translator for translating word information into a different language.

An electronic transltor is characterized in that word information is translated into a different language using an electronic circuit. Conventionally, an electronic translator has been proposed of the type in which a mark key is provided for marking words important to the operator and the words are successively called and outputted. This feature is preferred for language study. In the conventional translator of this type, a disadvantage that it is not indicated whether all of the marked words stored have been outputted upon the outputting of the last marked word.

SUMMARY OF THE INVENTION

Accordingly, it is an object of the present invention to provide an improved word information storage and retrieval device for indicating whether all of the marked words stored are outputted.

It is another object of the present invention to provide an improved electronic trnaslator for translating word information into a different language while it outputs information indicative of the condition that all the marked words stored are retrieved in response to the actuation of a mark recall key.

It is a further object of the present invention to provide an improved electronic translator for displaying or verbally outputting information indicative of the condition that all the marked words are outputted in response to the actuation of a mark recall key.

Other objects and further scope of applicability of the present invention will become apparent from the detailed description hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to a preferred embodiment of the present invention, an electronic translator comprises input means for inputting an entry word, output means responsive to the input means for outputting a word equivalent to the entry word, in which the entry word and the equivalent word are marked as being stored, and announcement means responsive to the output means for announcing that all the marked words have been outputted. Preferably, the announcement means is adapted to display or provide an announcement sound to show the occurrence of such a condition.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 10 shows a diagrammatic view of an alignment of words stored in a dictionary ROM;

FIG. 11 shows a diagrammatic view of a Japanese word table; and

FIG. 12 shows a diagrammatic view of a mark memory area formed in a microprocessor.

DETAILED DESCRIPTION OF THE INVENTION

First of all, any languages can be applied to a word information storage and retrieval device such as an electronic translator. Input words are spelled in a specific language to obtain equivalent words that may be spelled in a different language corresponding thereto. The mother and foreign languages can be selected freely. For example, it is assumed that the mother language is Japanese and the foreign language is English.

Figure 1:
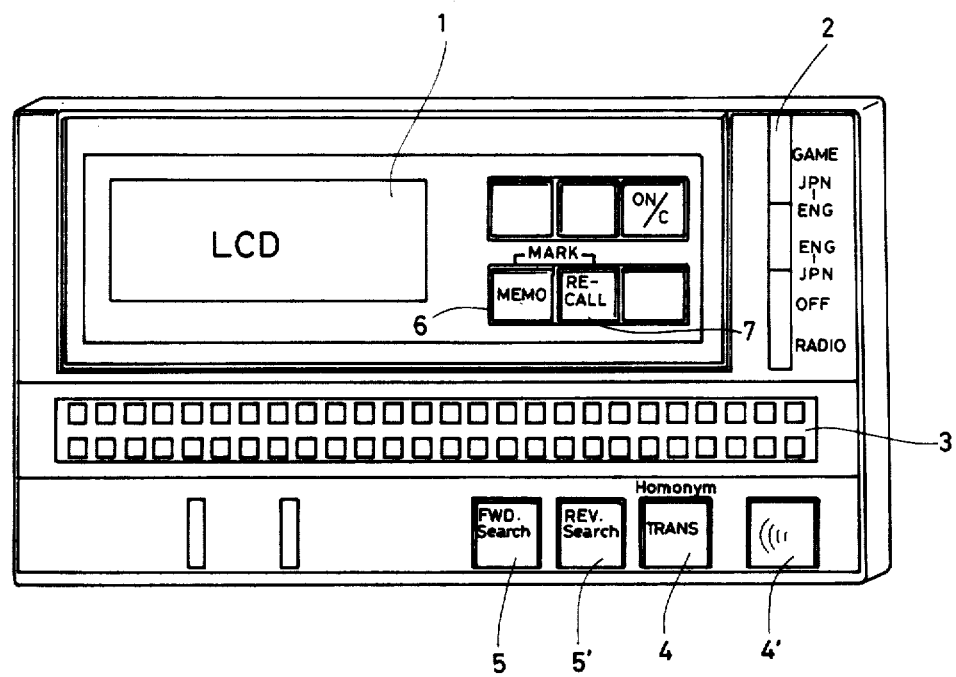
FIG. 1 shows a plan view of an electronic translator according to the present invention.

FIG. 1 shows an electronic translator according to the present invention. The electronic translator comprises a two-stage liquid crystal dot matrix display 1, a mode switch 2, a key array 3, a translation/homonym key 4, a voice synthesizing key 4', a forward search key 5, a reverse search key 5', and a mark memory key 6.

The display 1 is operated to display, in two rows, characters or symbols representing one or more words or sentences. Characters such as the alphabet and symbols such as numerals are inputted by the word key array 3. The mode switch 2 is operated to select one of a plurality of operation modes: a radio mode in which the translator operates as a radio receiver; an OFF mode in which the power is turned off; an English-Japanese (E-J) translation mode in which a translation from English to Japanese is carried out; a Japanese-English (J-E) translation mode in which a translation from Japanese to English is carried out; and a game mode in which an electronic game can be carried out. In these translation modes, any words and sentences can be inputted by the character key array 3 to output translated words and sentences and, further, speak them.

Although not described in detail, it may be possible to provide a dictionary mode in which a specific full word is inputted and the translation key 4 is actuated so that a corresponding translated word is outputted, or at least a part of the specific full word is inputted and the search key is actuated so that a corresponding translated word is outputted. This dictionary mode can be selected and enabled in the E-J mode and J-E modes. When the electronic dictionary is used in the dictionary mode, a translated word is displayed on the display, or is voiced in response to the operation of the translation key after the spelling of a desired word is inputted by the character key array or after the part of the spelling of the desired word is inputted and the desired word is searched by using said at least part of the spelling in response to the actuation of the search key.

The translation/homonym key 4 is operated to effect the translation and also calling for homonyms. Each of the backward search key 5' and the forward search key 5 is actuated to search the full word after at least one part of the spelling of the full word is inputted by the character key array 3 and displayed on the display 1. The mark memory key 6 is operated for marking or memorizing at least one word important to the operator. The mark recall key 7 is operated to output the at least one marked word.

Figure 2:
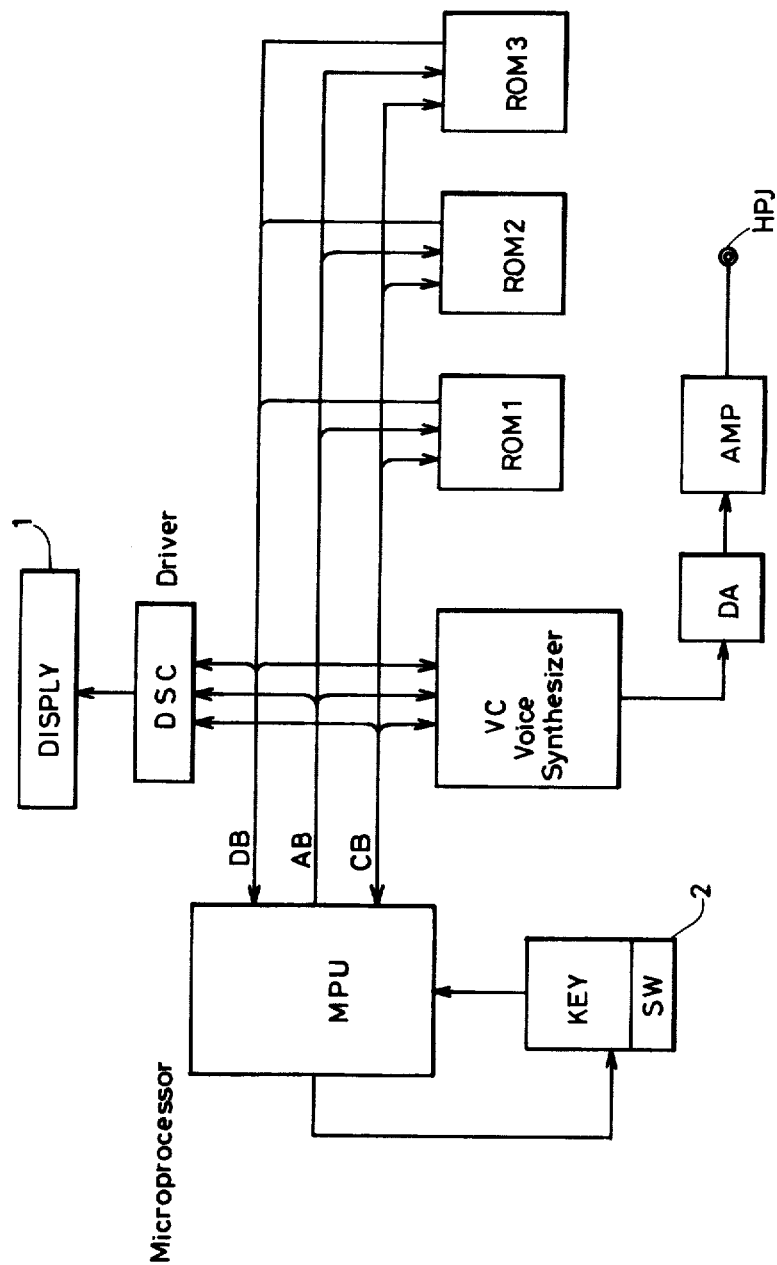
FIG. 2 shows a block diagram of a circuit that may be implemented within the electronic translator of FIG. 1.

FIG. 2 shows a block diagram of a circuit that may be implemented within the electronic translator of FIG. 1.

Referring to FIG. 2, the display 1 as shown in FIG. 1 is to a display driver "DSC" for controlling the display of the various characters or the symbols in the display 1. A microprocessor referenced as "MPU" is connected to a key input device KEY and the mode switch 2 so that the microprocessor MPU provides key strobe signals to the key input device KEY and the mode switch 2, and receives return signals therefrom for detecting the key input condition. A synthesizer referenced as "VC" is connected for voice synthesizing voice signals in accordance with sentence serial numbers or word serial numbers that may be obtained from the microprocessor MPU, thereby audibly producing sentence voice information or word voice information corresponding to the serial numbers. A D/A converter is provided for converting digital information into analog information. An amplifier referenced as "AMP" is connected for amplifying the voice information. A headphone jack referenced as "HPJ" is connected to the amplifier AMP.

A read-only memory (ROM) 1, a ROM 2, and a ROM 3 are connected to the microcomputer MPU through a data bus referenced as "DB", an address bus referenced as "AB" and a control bus referenced as "CB". The ROM 1 stores various control programs for the microprocessor MPU, so that it is called a control ROM. The ROM 2 stores data of various sentences and words, so that it is referenced as a dictionary ROM. The ROM 3 stores voice data for voice synthesizing, so that it is called a voice ROM.

The display driver controls the display the characters or the symbols on the display of 1. The display drive DSC is provided with a random-access memory for the display control such that each memory cell represents one dot corresponding respectively to one dot in the display 1. By forming a bit pattern within a certain area, a required image can be displayed in the display 1.

Figure 3:
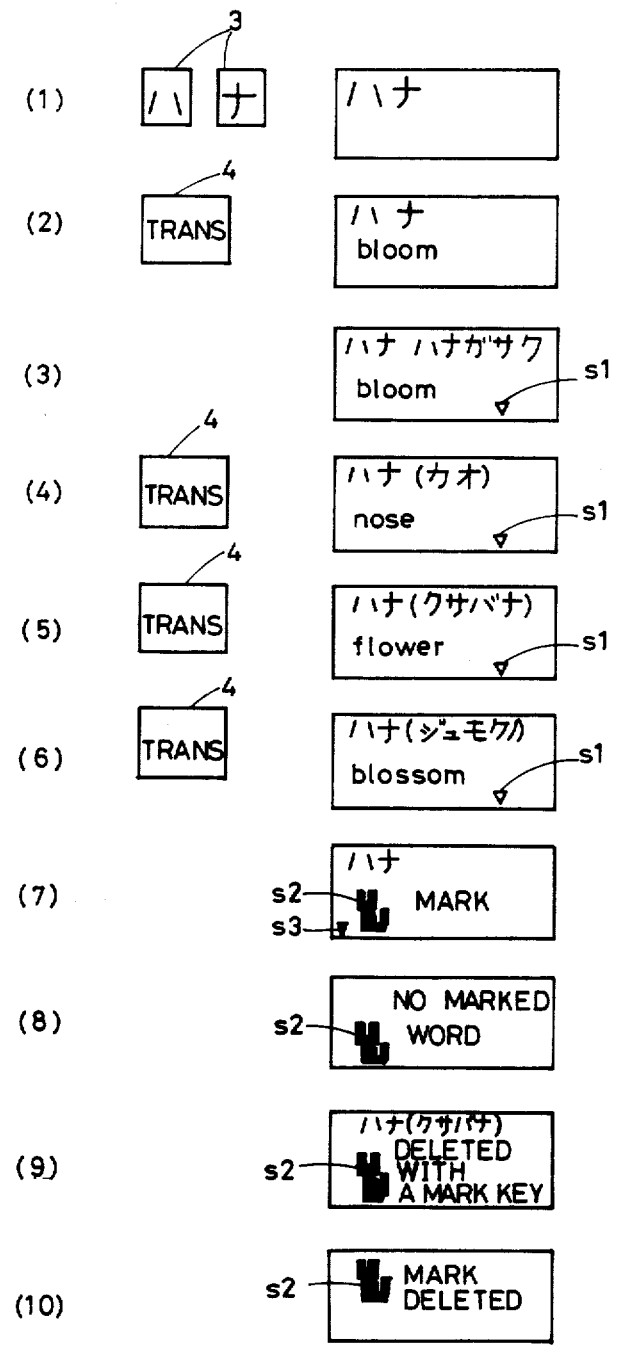
FIG. 3 shows display examples in the translator.

The operation of the translator of the present invention will be described with reference to flow charts as shown in FIGS. 4-9 and display examples as shown in FIG. 3.

Figure 4:
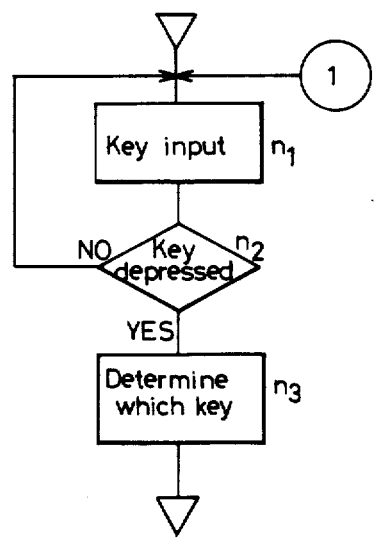
FIGS. 4 to 9 show various flow charts illustrating the operation of the translator of FIG. 1.

Referring to FIG. 4, when the mode switch 2 is operated to select the E-J or J-E translation mode, key inputs are read-in at step n1-n2 after the translator is initialized. If any key inputs are present, at step n3 detects which key has been actuated to execute the process corresponding to the input key.

Figure 5:
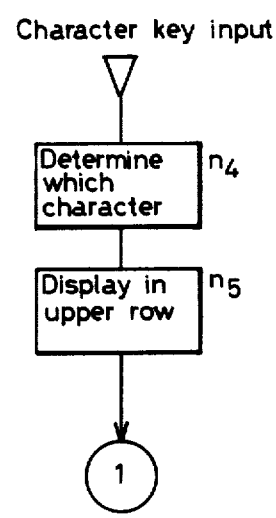

Referring to FIG. 5, if the inputted key is a character key, step n4 determines which character has been inputted, and the corresponding data are sequentially stored into an input buffer (not shown) Then, in step n5, the input word is displayed in the upper row of the display 1 as shown in FIG. 3, row (1). As an example, a Japanese word is inutted through the keys in the character key array 3, this Japanese word being phonetically read as "ha-ha", and its meaning is bloom, blossom, flower, or nose.

Figure 6:
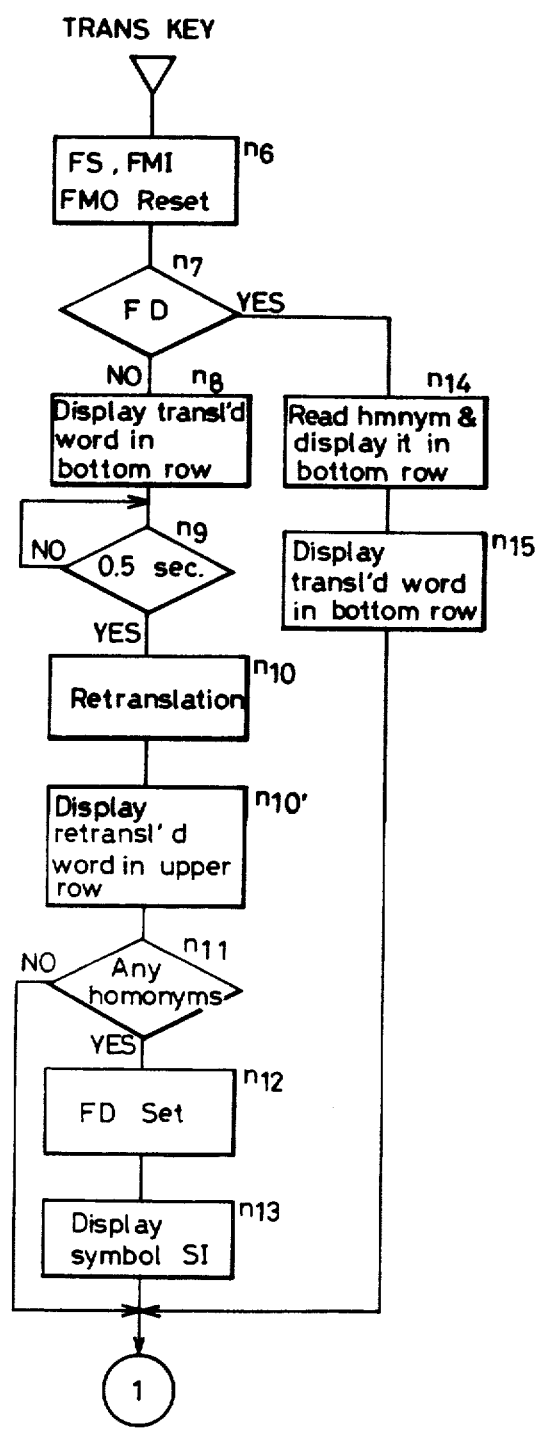

Thereafter, as shown in FIG. 6, the translation key 4 is operated to reset flags FS, FMI, and FMO in step n6 and the present condition of a flag FD is detected at step n7. These flags are conditional flags indicating the following conditions when they are set:

FS: the forward search key 5 has been operated.
FMI: the mark memory key 6 has been operated.
FMO: the mark recall key 7 has been operated.
FD: there are a number of homonyms.

Since initially FD=0, the program proceeds from step n7 to n8. In the mean time, an English word for the inputted Japanese word "ha-ha" is searched in the dictionary ROM, and at step n8, an English word "bloom", which is the first searched word, is displayed in the bottom row of the display 1, as shown in FIG. 3, row (2). After an interval of 0.5 second (step n9), the translated English word is translated back to Japanese (this translation is referred to as a "retranslation") at step n10. And the translated Japanese word or words for the English word "bloom" are displayed in the display 1 bottom row in place of the originally inputted Japanese word at step n10'. In the example as shown in FIG. 3, row (3), the retranslated Japanese words are (ha-na) and (ha-na-ga-sa-ku), which are the noun and verb forms of the bloom, respectively. Then, at step n11, it is detected whether there are any homonyms of the inputted Japanese word (ha-na). If there are homonyms, such as in the case of the given example, the flag FD is set in step n12, and a triangle symbol S1 shown in FIG. 3, row (3) is displayed at step n13 indicating that there are a number of homonyms.

After step n13, if the translation key 4 is operated again for the second time, the program proceeds to steps n7-n14-n15 so as to further search the English word for the inputted Japanese word (ha-na) from the dictionary ROM. If the English word "nose" is the second searched word, the original Japanese word (ha-na) is displayed in the upper row of the display 1 with a comment such as "ka-o" in Japanese, which means "face" in English, provided in parentheses, as shown in FIG. 3, row (4).

Then, after step n15, the translation key 4 is operated again for the third time, the program again proceeds to steps n7-n14-n15 to further search another English word for the Japanese word (ha-na). This time, the translator may retrieve the Japanese word corresponding to English "flower". Thus, the Japanese word (ha-na) is displayed with a comment such as (ku-sa-ba-na) which means "plants" in English, as shown in FIG. 3, row (5).

After that, if the translation key 4 is operated again for the fourth time, the same steps n7-n14-n15 are repeated again. This time, the translator may retrieve the English word "bloom". Thus, the Japanese word (ha-na) is displayed with a comment such as Japanese (ju-mo-ku-no), which means "of trees" in English, as shown in FIG. 3, row (6).

Figure 7:
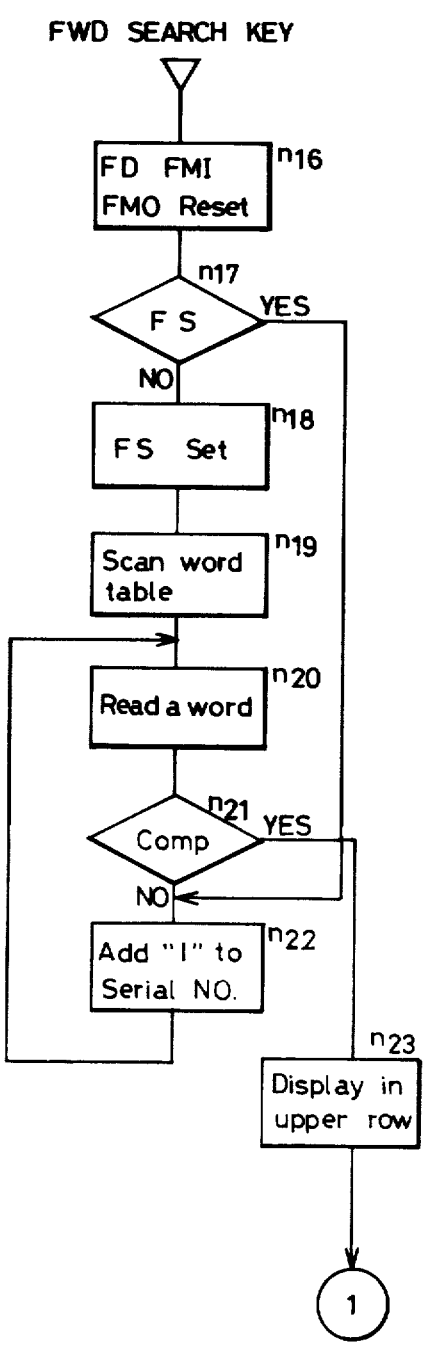

According to the preferred embodiment of the present invention, the word to be translated, such as (ha-na) in the above example, can be obtained based on some first alphabets without inputting the beginning part of the word, such as (ha). This can be done in the following steps using the forward search key 5:

After inputting the beginning part of the word, such as (ha), the forward search key 5 is operated, thereby starting the program as shown in FIG.7. At step n16, the flags FD, FMI, and FMO are reset. Since initially FS=0, the program advances to steps n17 and n18, at which the flag FS is set. Then, a word starting with (ha) is retrieved from a Japanese word table containing Japanese words that are stored in the Japanese alphabetical order (A I U E O . . . ) and the serial number given to each word. This searching is carried out by calling the word table at step n19, reading a word with a earlier serial number of the stored words at step n20, and comparing the beginning characters with the inputted characters (ha) at step n21. If these two words do not match with each other, the program advances step n22 at which "1" is added to the serial number so as to read-out the next word in the table at step n20. Thereafter, a similar comparison is carried out repeatedly by repeating the steps n21-n22-n20. When the characters match with each other, the program advances from steps n21 to n23 at which all the characters of the word starting with (ha) are displayed.

If the word displayed in the display 1 is the word to be searched, the translation procedures can be carried by operating the translation key 4 in the manner as described above. If the word is not the word to be searched, then, the operator can operate the forward search key 5 again to search the next word staring with (ha). In this case, the program advances through steps n17-n22-n20-n21-n23. By repeating this operation, the operator can find out the word without inputting all the characters of this word.

Although the above operation is described so as to find the Japanese word, the same operation can be carried out to find the English word.

According to the preferred embodiment of the present invention, a mark can be given to a certain number of words to have access to such words whenever they are to be searched. This function is suitable when learning words, in the case where words are needed to be stored or the like situation. Marking the word is done by operating the mark memory key 6, so that outputting the marked word is done by the mark recall key 7 through the steps to be described below.

Figure 8:
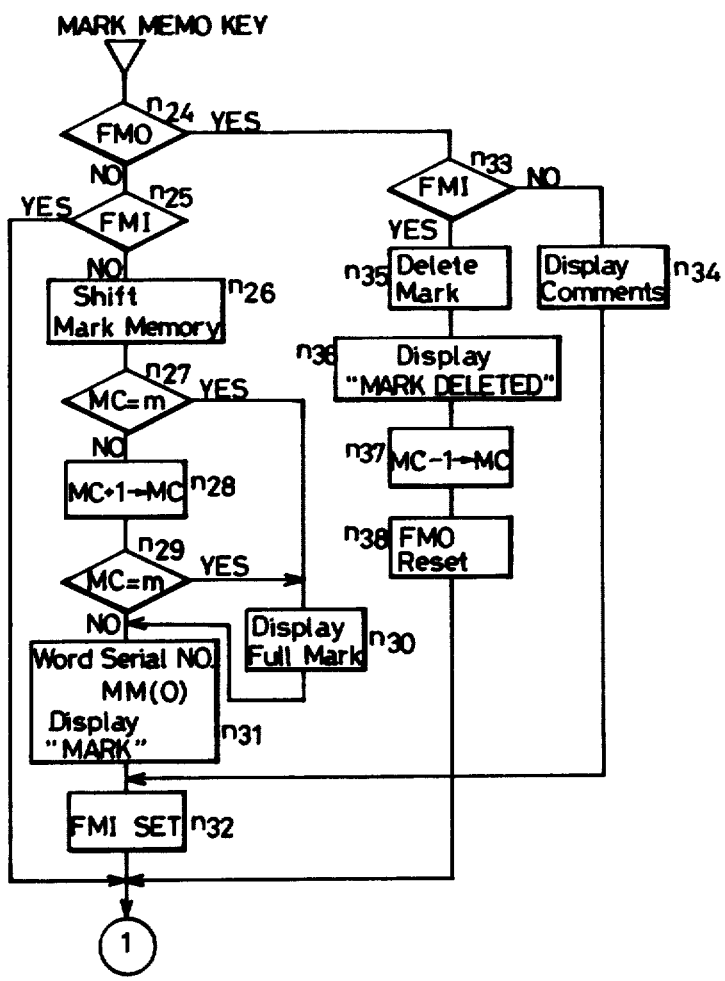

FIG. 8 shows a flow chart in response to the operation of the mark memory key 6.

Referring to FIG. 8, when an English or Japanese word, which has not been marked yet,such as (ha-na), is displayed in the display 1, the mark memory key 6 is depressed.

n24-n25-n26: The conditions of the flags FMO and FMI are detected. When FMO=0 and FMI=0, the whole contents of the mark memory region are shifted by one word toward the last address direction.

n27: It is detected whether the mark memory has been filled in the previous mark memory operation. "MC" designates a mark word number counter for counting the number of words capable of being marked. Character "m" designates the maximum number of the words that can be marked.

n27-n30: When the mark memory has been filled in the previous mark operation as indicated with "MC=m", a full-mark symbol S3 is displayed as shown in FIG. 3, row (7)

n31: The serial number of the word to be marked is stored in the first address "MM(O)" in the mark memory. As shown in FIG. 3, row (7), a prompt message such as "MARK" is displayed indicating that the word has been marked.

n32: The FMI flag is set to indicate that the mark memory key 6 has been operated.

n28: This step is selected when it is detected at step n27 that the mark memory has not been filled. The mark word counter MC is incremented.

n29: It is detected whether MC=m to detect whether the present marking causes the mark counter to be filled.

n30: When the mark memory has been filled, the full-mark symbol is displayed as described above. Thereafter, the operations following step n31 are conducted.

On the other hand, when the mark memory has not been filled, the operations following step n31 are conducted, promptly.

n24-n25-①: If FMO=0 and FMI=1, no operation is selected. That is, even when the mark memory key 6 is operated twice or more, only the first operation is detected to be effective.

n24-n33-n32: When it is detected that FMO=1 and FMI=0 indicating that some marked word has been outputted by the previous operation of the mark recall key 7, the comments are displayed as shown in FIG. 3, row (9). The flag FMI is reset. The comment display shows that once the mark recall key 6 is again operated, the presently outputted word is released from being marked.

n24-n33-n36-n37-n38: When the mark memory key 6 is operated, the serial number of the marked word is deleted from the mark memory, so that the comments are displayed as shown in FIG.3, row (10). The deleting of the serial number is carried out by shifting by one word in the first address direction, the whole contents of the addresses following the address containing the serial number to be deleted. The mark counter MC is decremented and the flag FMO is reset.

Figure 9:
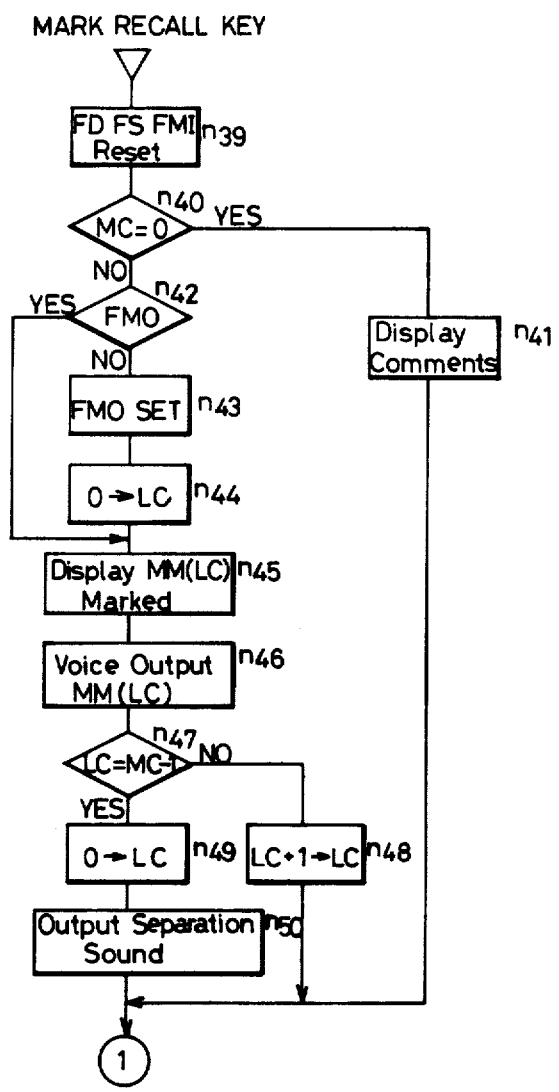

FIG. 9 shows a flow chart of the operation in response to the operation of the mark recall key 7.

n39-n40: First, the flags FD, FS, and FMI are reset. It is detected whether MC=0.

n40-n41: If MC=0, the display of "NO MARKED WORD" is enabled as shown in FIG. 3, row (8).

n40-n42: If MC≠0, the condition of the flag FMO is detected.

n42-n43-n44: If FMO=0 is detected, indicating that the mark recall key 7 has not been operated at just the preceding case, the flag FMO is set and a pointer for detecting a position from which the address data of the marked word should be read-out is reset.

n45-n46: If FMO=1, the pointer L keeps the previous value without any advance. The mark memory is caused to generate the serial number of the marked word which is positioned at the position as directed by the pointer LC. The generated marked word is displayed at the upper row of the display 1 and the generated marked word is voice synthesized.

n47: It is detected at this step whether "L=MC−1", indicating that the marked words relating to the serial numbers stored in the mark memory are all outputted.

n47-n49-n50: When "LC=MC−1", the pointer L is reset, so that an announce sound is generated to indicate that all the marked words have been outputted and the presently outputted word is the last marked word.

n47-n48: When the contents of the pointer L are smaller than the results of "MC−1", the pointer LC is incremented to become ready for the next operation of the mark recall key 7.

FIG. 10 shows a diagrammatic view of an alignment of the words as stored in the dictionary ROM (ROM 2). The words in the English and Japanese word are aligned alternatively such that after each English word, the corresponding Japanese word or words are stored. The words are separated from each other by suitable codes, or serial numbers disposed therebetween, e.g., in blank spaces as shown in FIG. 10. Preferably, the English words are aligned in alphabetical order.

FIG. 11 shows a diagrammatic view of a Japanese word table containing the Japanese words in the Japanese alphabetical order (A I U E O . . . ) and the serial number given to each word. The serial numbers are those given to the words stored in the dictionary ROM, as shown in FIG. 10.

Whether there are any homonyms is detected by comparing the searched word with a word listed before or after the searched word in the table. If the same words are listed twice consecutively, it is detected that a homonym exists for the searched word.

FIG. 12 shows a diagrammatic view of the mark memory provided in the microprocessor MPU. The mark memory has a predetermined size of memorizing area MM, and is so arranged as to memorize only the serial number.

As described above, the input of the entry word enables the equivalent or translated word to be retrieved, so that the entry word and the equivalent or translated word are marked individually. The present invention is characterized in that the marked words are subsequently retrieved in response to the actuation of the mark recall key and that, when all the marked words have been retrieved, the announcement is made to indicate this condition. Even when the number of the marked words is large, it is easily detected by the operator whether all the marked words have been retrieved.

Further, in the present invention, in case a number of words are to be subsequently marked and some old marked must be deleted bcause they overflow the mark memory, it is detected during the marking operation which marked word is the oldest, whereby the marked word to be deleted can be recognized.

The invention being thus described, it will be obvious that the same may be varied in many ways. SUch variations are not to be regarded as a departure from the spirit and scope of the invention, and all such modifications are intended to be included within the scope of the following claims.

What is claimed is:

1. An electronic translator comprising:
   primary memory means for storing data associated with source words of a first language and equivalent words of a second language, said equivalent words corresponding in meaning to respective source words;
   input key means for inputting a desired entry word into said translator;
   processor means responsive to said input key means for locating a said source word corresponding to said desired entry word and recalling its corresponding equivalent word;
   output means, responsive to the processor for outputting said equivalent word in response to the input of said desired entry word into said translator;
   mark memory means for storing a subset of the data associated with said source words and said equivalent words;
   mark key means for individually marking source words and equivalent words to be stored in said mark memory means;
   recall key means for individually outputting said marked words from said mark memory means in sequential order; and
   announcement means for monitoring said sequential outputting of said marked words by said recall key means and indicating when all of said marked words have been outputted from said mark memory means by said recall key means.

2. The electronic translator of claim 1, further comprising search key means for locating an entry word that has been partially inputted by said input key means.

3. The electronic translator of claim 1, further comprising homonym means for indicating that an entry word inputted by said input key means has associated therewith at least two corresponding equivalent words.

4. The electronic translator of claim 1, wherein said output means comprises an alphanumeric display.

5. The electronic translator of claim 1, wherein said output means comprises audible speech synthesizing means.

* * * * *